United States Patent [19]

Chan

[11] Patent Number: 4,950,447
[45] Date of Patent: Aug. 21, 1990

[54] SNUBBER MONITORING SYSTEM FOR NUCLEAR POWER PLANTS

[75] Inventor: Aaron C. Y. Chan, Brea, Calif.

[73] Assignee: Westinghouse Electric Corp., Pittsburgh, Pa.

[21] Appl. No.: 393,206

[22] Filed: Aug. 14, 1989

[51] Int. Cl.$^5$ .............................................. G21C 17/00
[52] U.S. Cl. ................................... 376/247; 376/245; 376/285; 376/258; 73/11
[58] Field of Search ............... 376/245, 285, 247, 258; 73/11

[56] References Cited

U.S. PATENT DOCUMENTS

| | | | |
|---|---|---|---|
| 4,082,610 | 4/1978 | Matthews | 376/234 |
| 4,550,589 | 11/1985 | Wright, Jr. | 73/11 |

*Primary Examiner*—Stephen J. Lechert, Jr.
*Assistant Examiner*—Nina Bhat
*Attorney, Agent, or Firm*—E. F. Possessky

[57] ABSTRACT

A snubber monitoring system is provided for a nuclear power plant wherein the snubbers are disposed at various locations within a plant containment structure to support piping and equipment rigidly against seismic and vibratory loading while permitting thermal expansion and contraction thereof. The system includes displacement sensing means and temperature sensing means coupled to each of the snubbers to generate continuous snubber displacement and pipe and equipment temperature signals.

A sensor data highway system has cable connected data collectors disposed within the plant containment to collect the snubber sensor signals. A receiver and a programmed computer system are located outside the containment to process the snubber displacement and pipe and equipment temperature signals to provide substantially continuous snubber monitoring. A data highway cable extends through the containment to couple the signal collectors to the receiver and computer system.

The sensor signals are processed to detect snubber failures in any of a plurality of failure modes and in any of a plurality of plant operating modes. A historic record is created for snubber operating and failure data.

9 Claims, 2 Drawing Sheets

SNUBBER MONITORING SYSTEM FOR NUCLEAR POWER PLANTS

BACKGROUND OF THE INVENTION

The present invention relates to nuclear power plants and more particularly to monitoring systems for snubbers used to support plant piping and equipment to withstand seismic and vibratory loading while permitting thermal expansion and contraction.

Power plants normally operate through heatup and cooldown cycles. As temperature changes occur, piping systems and equipment move as a result of thermal expansion and contraction. In the basic plant design, support systems need to be designed to allow thermal movement and thereby avoid overstressing the piping and equipment. At the same time, the piping and equipment needs to be supported rigidly to withstand seismic and vibratory loading such as water hammer loading.

Resolution of these seeming contradictory requirements on the support systems design is achieved through the use of special support members. These devices are known as snubbers and are used extensively throughout a nuclear power plant to provide piping and equipment support that permits the supported piping or equipment to move under thermal loading yet hold the piping or equipment rigid during seismic or other vibratory events.

A typical snubber can be mechanical or hydraulic in design. Most snubbers are shaped like automobile shock absorbers, but they vary greatly in size, weight, and load capacity. With proper functioning, a snubber extends or contracts slowly along its axis under thermal loading. Under sudden seismic or vibratory type accelerations, the snubber becomes rigid or "locks-up".

To reduce or avoid snubber failures and thereby enhance plant safety, The Nuclear Regulatory Commission requires electric utilities to perform snubber operability testing. Typically, such testing during plant shutdowns has involved selecting a predetermined fraction of the plant snubbers for four failure modes. These modes are:
1. Failure to lock up under seismic and vibratory loading.
2. Snubber hydraulic system leaks that allow snubber contraction or expansion in exces of prescribed rates under seismic and vibratory loadings.
3. Inadvertent lock-up that prevents thermal movement of supported piping or equipment which could thus undergo high thermal stress and fatigue.
4. Excessive drag force on expansion and contraction of the snubber thereby restricting thermal movement and increasing thermal stress in supported piping or equipment.

If snubber failures are found in the testing program, statistical sampling methodology is used to increase the sample size. With some snubbers being rather massive and located in highly radioactive areas, and especially with larger test sample sizes, snubber testing programs can be very costly. More importantly, snubber testing programs provide limited enhancement of plant safety since only sampled snubbers are tested and since only one-shot testing is performed during shutdown and not continuously during plant operation.

In U.S. Pat. No. 4, 550,589, entitled SYSTEM FOR MONITORING SNUBBER LOADS and issued to W.S Wright on May 2, 1984, a monitor system is disclosed that more continuous and more extensive snubber monitoring. However, that system generally employs a threshold comparator circuit located near each snubber to store a predetermined threshold value of snubber displacement. The outputs of the comparators are radio linked to a data recorder outside the plant containment. All of the snubbers may be monitored but the system is limited to a single excessive displacement value comparison test. While excessive snubber displacements can thus be detected continuously, insufficient displacements cannot be detected at all. Further, different plant operating modes create varying operating conditions which result in different excessive displacement criteria for the different modes and such differences cannot be accommodated by the prior art system. Accordingly, the prior art is limited in the flexibility and the completeness with which snubber monitoring is achieved.

The present invention is directed to a improved snubber monitoring system characterized with more complete and more flexible snubber monitoring and thereby enabling costly snubber testing programs to be reduced in scope significantly or totally and providing improved nuclear power plant safety.

SUMMARY OF THE INVENTION

A system is provided for monitoring the operation of a plurality of elongated snubbers in a nuclear power plant wherein the snubbers are disposed at various locations within a plant containment structure to support piping and equipment rigidly against seismic loading while permitting thermal expansion and contraction thereof. The system includes displacement sensing means coupled to each of the snubbers to generate continuous snubber displacement signals.

A sensor data highway system has data collection means disposed within the plant containment to collect the snubber displacement signals. Receiving and processing means located outside the containment process the snubber displacement signals to provide substantially continuous snubber monitoring. Cable means extend through the containment to couple the signal collecting means to the receiving and processing means.

DESCRIPTION OF THE PREFERRED EMBODIMENT

Figure 1:
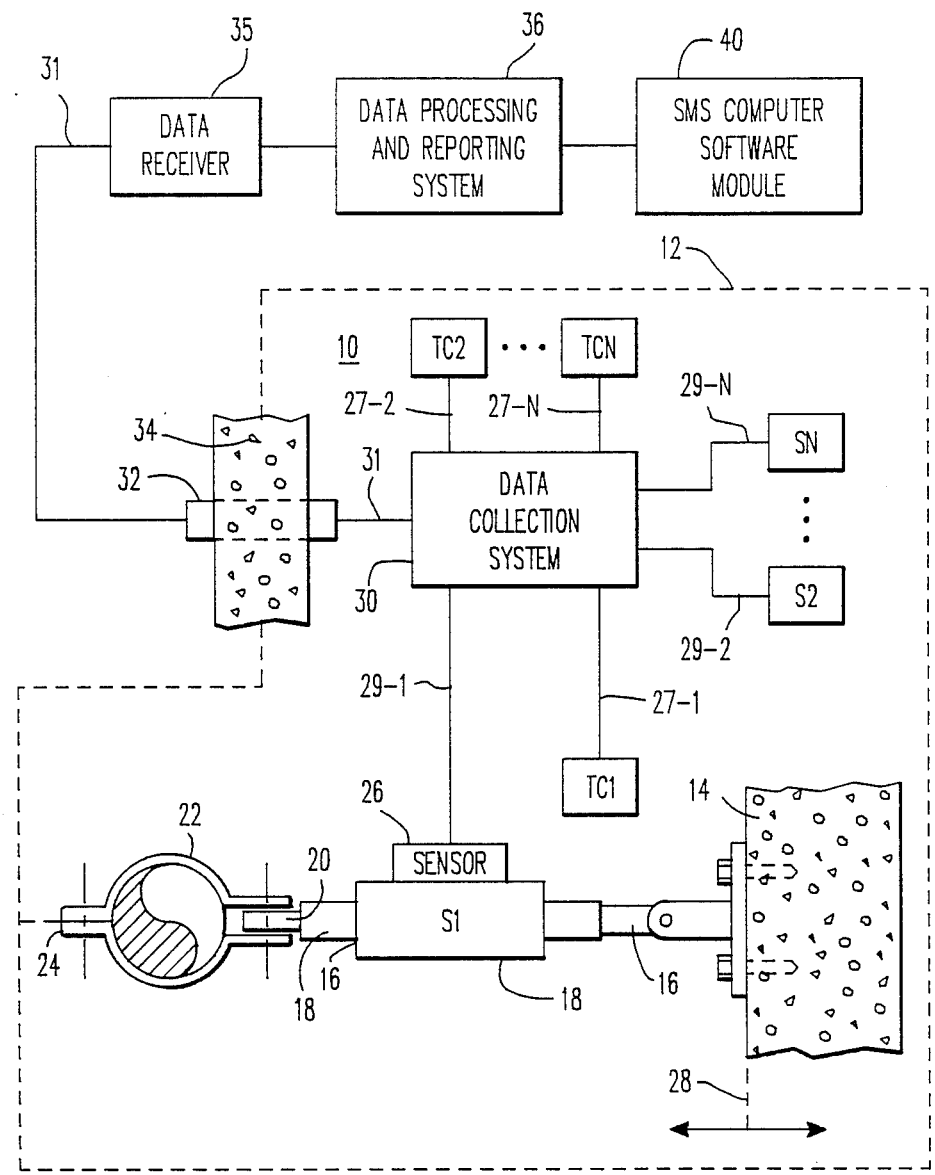
FIG. 1 is a schematic diagram of a nuclear power plant and a snubber monitor system arranged therefor in accordance with the invention.

More particularly, there is shown in FIG. 1 a nuclear power plant 10 represented by doted box 12 which corresponds to containment structure within which the reactor core, steam generation system and related equipment are disposed.

A plurality of snubbers are disposed within the containment structure to support piping and equipment in accordance with a specific mechanical design for the plant 10. As previously described, the snubbers S1 .... Sn provide support that enables thermal expansion and contraction of the supported structure while providing rigid support against seismic events.

The snubber S1 is illustrated with some schematic detail to provide an understanding of the snubber operation and the manner in which it is monitored. Thus, the snubber S1 has a base member 16 rigidly mounted on a portion 14 of the containment structure. A movable member 18 is supported telescopically over the base member 16 for axial movement relative thereto. The outer end of the movable member 18 has a clevis 20 or the like to support a pipe 22 at one pipe location. The pipe 22 is provided with primary support relative to the containment as indicated by the reference character 24.

The snubbers S2... SN support the pipe 22 at other locations, other piping (not shown) and various plant equipment items. The plant 10 may contain 200 or more snubbers.

Each snubber is provided with a displacement sensor 26 that generates a preferably continuous electric signal representing axial expansion or contraction displacement of the movable snubber member 18 relative to a reference plane 28. In addition, thermocouples TC1... . TCN are provided for the snubbers to generate temperature signals over lines 27-1 ..... 27-N for data collection, storage and processing.

Commercially available lanyards can be employed as the snubber displacement sensors. Since the transmitted displacement and temperature sensor signals are continuous, continuous snubber monitoring is enabled which is far better than the prior art monitoring scheme in which, for example, sensor signals are generated only when preset snubber displacement threshold values are exceeded.

With continuous displacement and temperature monitoring, historic snubber data can be preserved to enable analysis of piping system and equipment behavior, related snubber displacements prior to any detected snubber failure and the resulting piping and equipment thermal stress. In addition, plant engineers have access to total plant snubber displacement data even if no snubber failure occur thereby enabling the engineers to make piping and equipment performance analyses under different plant operating modes and various operating conditions. In short, plant thermal and structural diagnostics are greatly facilitated and significant improvement is thus achieved in plant safety and plant management capability.

All snubber displacement sensors are preferably wired to a data collection system 30 (comprising a plurality of cable connected Sensor Processing Modules in its preferred form) as indicated by the reference characters 29-1 through 29-N. In turn, as indicated by the reference character 31, the data collection system 30 is coupled by cable through a penetration tube 32 in another containment portion 34 to transmit collected snubber displacement and/or temperature data signals for external processing where an environment exists that is far more favorable than the environment within the containment. Component and system reliability and plant safety are thus all enhanced.

As a result of the adverse temperature, humidity, radiation and electrical interference environment within the containment, the data collection system 30 is preferably hard wired as described and preferably a low cost highway system such as the Westinghouse Sensor Highway is employed. The Westinghouse Sensor Highway requires only one coaxial cable, or trunk line, to monitor up to 1,664 digital or 128 analog sensors. As a result, the need for multiple cables and conduit is eliminated and associated field installation cost and effort is significantly reduced. This has even greater value in the present case where inside reactor containment sensors are involved because only one penetration is required for each set of sensors. This not only eliminates the need for costly penetration additions, but has the added advantage of freeing up currently installed penetrations for other uses. Additions to The Sensor Highway are easy and the associated cost of adding sensors is small. Additions can be accomplished by simply tapping into an existing trunk line.

Use of The Sensor Highway reduces the field wiring costs associated with diagnostics and monitoring equipment. As a result, additional diagnostic and monitoring data can be obtained more economically leading to better plant availability and maintainability.

The Sensor Highway System works on the basis of frequency modulation. Each sensor is connected to a Sensor Processing Module (SPM) which contains a Sensor Highway Chip, the heart of the system. When the SPM reads a sensor signal, the Sensor Highway Chip converts the signal to the FM modulation of one of 128 carrier frequencies available for transmission. The data collection system is formed by the interconnected SPMs.

The carrier frequency routes the signal into the data receiver 35, which samples each signal and converts it back to its analog or digital equivalent for computer processing. Each SPM is capable of monitoring multiple sensors, depending upon the type of sensor.

The Sensor Processing Module (SPM) is designed with radiation hardened electronics for extended use in radiation environments. A variety of sensors can be used in the system: accelerometers, thermocouples, RTDs, position sensors, level transducers, digital, strain gauges, differential pressure transducers, acoustics transducers, others.

One hundred twenty-eight different highway taps are available, each having its own carrier frequency which is reachable through jumper selectable circuitry. Sensors can be added by tapping into the single trunk line. All sensors are electrically isolated from the trunk line in the SPM to protect the Highway. Separate power feeds are not necessary because power is supplied to system components and sensors through the trunk line. Each SPM can monitor multiple sensors (one (1) analog AC signal, up to four (4) analog DC signals or up to thirteen (13) digital signals).

In summary of the Sensor Highway System, only one trunk cable needs to be installed and only one coaxial or triaxial containment penetration is necessary when inside containment sensors are involved. The time and labor for system maintenance and trouble-shooting is accordingly reduced. The system is easily expandable up to 128 SPMs at low cost.

Data signals transmitted over the data highway 31 are applied as inputs to a data receiver 35 where they are sampled and converted for application to a data processing and reporting system 36 where a historic record is kept of the variation of the various snubber displacements over time. In addition, programmed processing of the snubber displacement and temperature values is performed to generate snubber failure alarms thereby more or less continuously signifying any real time failure of any snubber based on the types of failure for which snubber data comparisons are made.

Figure 2:
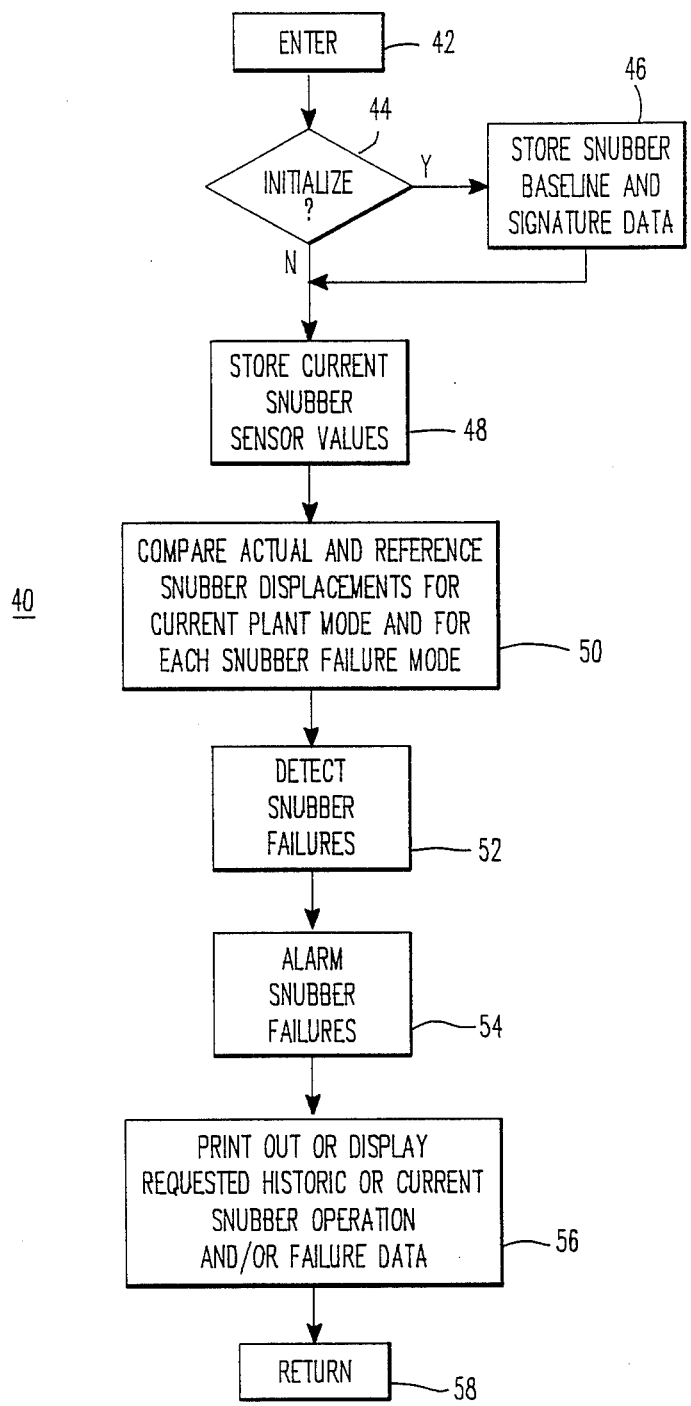
FIG. 2 shows a block diagram illustrating the collection, processing, and reporting of snubber system data in accordance with the invention.

The snubber data processing provided by the system 36 is illustrated by a flow chart for a snubber data processing program 40 in FIG. 2. The system 36 is a conventional microprocessor system or work station having data input signal interfacing capability, programmed computer processing capability, and a reporting capability implemented through a printer, cathode ray tube and/or other output peripherals.

The program 40 is executed periodically and once it is entered at block 42, a determination is made by block 44 as to whether program initialization has been performed, i.e. whether snubber baseline data have been established. If not, block 46 establishes the snubber baseline data. In the baselining process, snubber displacements and pipe and equipment temperatures first determined by thermal design computer analysis for different plant operating modes are entered into the system. Next, actual snubber axial displacements and pipe and equipment temperatures obtained by field measurements during hot functional testing of the plant in the different plant operating modes are entered and compared to the stored calculated displacement and temperature data. The correct or benchline displacement and temperature data is determined for each snubber for each plant operating mode from the calculated and measured sets of data.

Different plant operating modes produce different snubber displacements primarily because the different modes carry different steady state plant temperature conditions. For example, the pressurizer spray system is operated at full flow conditions for 5% to 10% of the time with several hundred gallons per minutes flow at approximately 557° F. For the remaining 90% to 95% of the time, the system will experience 1 to 5 gallons per minute flow at approximately 520° F. The snubbers attached to this piping system would see different displacements as the temperature changes. Hence, a monitoring system must be able to detect unacceptable pipe displacements for all different operation modes. U.S. Pat. No. 4,550,589 utilizes hardware to determine acceptance. It is thus limited to one threshold displacement value only.

Once snubber baseline is completed by block 46, the program proceeds to block 48 and subsequent program executions go directly from the block 44 to the block 48. In block 48, the current pipe and equipment temperatures and snubber displacement data are stored. Certain monitored failure modes require snubber signatures, that is snubber displacement is recorded as a function of time and temperature for each snubber over an extended period of plant operating time in each plant operating mode until a characteristic performance (signature) is determined for each snubber in each plant operating mode. Snubber signatures are stored for use as criteria in detecting failure modes 1 and 2 in block 50.

Preferably, the block 50 tests for four different snubber failure modes as follows:

1. Failure to lock up under seismic loading.
2. Snubber hydraulic system leaks that allow snubber contraction or expansion in excess of prescribed rates under seismic loading.
3. Inadvertent lock-up that prevents thermal movement of supported piping or equipment which could thus undergo high thermal stress and fatigue.
4. Excessive drag force on expansion and contraction of the snubber thereby restricting thermal movement and increasing thermal stress in supported piping or equipment.

Snubber failures in failure modes 3 and 4 are detected by comparing current snubber displacement data with stored baseline data for the plant operating mode then existing.

Once snubber signatures have been developed, block 50 detects any snubber failures in failure modes 3 or 4 by comparing current snubber displacement and temperature and elapsed time data with stored signature data for the plant operating mode then existing.

While the prior art typically is limited to detecting "excess" snubber displacements, that is displacements that exceed a fixed value, the present invention enables snubber movement to be evaluated for sufficiency as well as excess. These results stem from the fact that software flexibility is available to enter, develop and/or update multiple and condition dependent snubber displacement criteria to meet engineering evaluation needs.

After snubber failure detection in block 50, snubber failures are listed and stored by block 52 and alarmed by block 54. Finally, before the program is returned by block 58, any requested reports are generated by block 56 for CRT display or for printout. Such reports may include a current or historic list of snubber failures with related plant operating data, snubber displacement data with related temperature and other plant operating data, etc.

What is claimed is:

1. A system for monitoring the operation of a plurality of elongated snubbers in a nuclear power plant wherein are the snubbers are disposed at various locations within a plant containment structure to support piping and equipment rigidly against seismic and vibratory loadings while permitting thermal expansion and contraction thereof, said system comprising:
    means coupled to each of said snubbers for substantially continuously sensing axial displacement thereof and generating signals corresponding thereto;
    a sensor data highway system having means disposed within the plant containment for collecting the snubber displacement signals;
    means located outside the containment for receiving and processing the snubber displacement signals to provide substantially continuous monitoring thereof; and
    said data highway system further having cable means extending through the containment and coupling said signal collecting means to said receiving and processing means.

2. A snubber monitoring system as set forth in claim 1 wherein:
    means are coupled to each of said snubbers for sensing the pipe and equipment temperatures;
    said temperature sensing means coupled to said signal collecting means for transmittal to said receiving and processing means.

3. A snubber monitoring system as set forth in claim 1 or 2 wherein said processing means includes:
    means for substantially continuously comparing the actual displacement of each snubber to a reference displacement value therefor; and
    means for generating an alarm for each snubber for which the actual displacement exceeds the reference value.

4. A snubber monitoring system as set forth in claim 3 wherein:
    said comparing means includes a plurality of displacement references for each snubber with the respective displacement references corresponding to respective possible snubber failure modes; and said alarm generating means generates an alarm identified to each snubber and its failure mode for all actual snubber displacements that fail to satisfy their respective references.

5. A snubber monitoring system as set forth in claim 3 wherein:
said comparing means includes a plurality of displacement references for each snubber for each of a plurality of different plant operating modes; and
said alarm generating means generates an alarm identified to each snubber and the plant operating mode for all actual snubber displacements that fail to satisfy their respective references.

6. A snubber monitoring system as set forth in claim 4 wherein:
said comparing means includes a plurality of failure mode sets of displacement references for each snubber for each of a plurality of plant operating modes.

7. A snubber monitoring system as set forth in claim 4 or 6 wherein the snubber displacement references are based on failure modes that include first and second modes:

failure to lock-up under seismic and vibratory loading; and
inadvertent snubber lock-up that prevents thermal movement of supported piping or equipment.

8. A snubber monitoring system as set forth in claim 7 wherein the failure modes further include third and fourth modes:
excessive snubber hydraulic system leaks that allow snubber contraction or expansion in excess of prescribed rates under seismic loading;
excessive drag force on snubber movement that restricts thermal movement of supported piping or equipment; and
the snubber references include a time correlated displacement/temperature signature obtained and stored for each snubber for at least one plant operating mode during plant field testing and startup for use in detecting the third and fourth failure modes.

9. A snubber monitoring system as set forth in claim 3 or 4 or 5 or 8 wherein said temperature sensors are included and said processing means includes:
means for storing and generating a historic record of time correlated snubber operating data based on sensed snubber displacements and pipe and equipment temperatures and detected snubber failures.

* * * * *